United States Patent
Shih et al.

(10) Patent No.: US 7,251,975 B2
(45) Date of Patent: Aug. 7, 2007

(54) MANUFACTURING TOOL FOR FLUID DYNAMIC BEARING

(75) Inventors: Wun-Chang Shih, Tu-Cheng (TW);
Huan-Chao Lin, Tu-Cheng (TW);
Ching-Hsing Huang, Tu-Cheng (TW);
Chien-Long Hong, Tu-Cheng (TW);
Hsien-Sheng Pei, Tu-Cheng (TW)

(73) Assignee: Foxconn Technology Co., Ltd., Tu-Cheny, Taipei Hsien (TW)

( * ) Notice: Subject to any disclaimer, the term of this patent is extended or adjusted under 35 U.S.C. 154(b) by 167 days.

(21) Appl. No.: 11/165,943

(22) Filed: Jun. 24, 2005

(65) Prior Publication Data

US 2006/0123623 A1 Jun. 15, 2006

(30) Foreign Application Priority Data

Dec. 10, 2004 (TW) .............................. 93138261 A

(51) Int. Cl.
*B21D 1/02* (2006.01)

(52) U.S. Cl. ............................ 72/112; 72/118; 409/259; 407/13

(58) Field of Classification Search .................... 72/67, 72/70, 71, 75, 102, 112, 115, 118, 123, 370.21; 29/898.02, 898.13; 409/71, 259, 261; 407/13; 470/84, 198, 204
See application file for complete search history.

(56) References Cited

U.S. PATENT DOCUMENTS

| | | | | |
|---|---|---|---|---|
| 3,824,827 A | * | 7/1974 | Stockbridge et al. | .......... 72/123 |
| 5,325,695 A | * | 7/1994 | Seo et al. | ...................... 72/112 |
| 5,339,523 A | * | 8/1994 | Hasegawa | ................ 29/898.02 |
| 5,758,421 A | | 6/1998 | Asada | |
| 5,836,077 A | * | 11/1998 | Usui et al. | ................ 29/898.02 |
| 5,931,038 A | * | 8/1999 | Higashi | .......................... 72/70 |
| 6,477,877 B1 | | 11/2002 | Usui | |

* cited by examiner

*Primary Examiner*—Ed Tolan
(74) *Attorney, Agent, or Firm*—Morris Manning & Martin LLP; Tim Tingkang Xia, Esq.

(57) ABSTRACT

A manufacturing tool (20) for forming a dynamic pressure groove (52) in an inner peripheral surface of a bearing sleeve (50) includes a tool shaft (21) for being rotated in a bore of the bearing sleeve while being moved in an axial direction thereof. Protrusions (25) are integrally and circumferentially arranged on an outer periphery of the tool shaft near a leading end (22) thereof. Machining tips (26) are integrally formed on outmost ends of the protrusions for machining the inner peripheral surface of the bearing sleeve to form the dynamic pressure groove therein.

16 Claims, 4 Drawing Sheets

MANUFACTURING TOOL FOR FLUID DYNAMIC BEARING

TECHNICAL FIELD

The present invention relates generally to tools for manufacturing fluid dynamic bearings, and more particularly to a manufacturing tool for forming a dynamic pressure generating groove on a fluid dynamic bearing.

BACKGROUND

Due to request for low abrasion on rotational elements to achieve an extended life and for low extent of noise, fluid dynamic bearings (FDBs) have been used in fan motors and hard disk drive motors.

As shown in FIG. 4, in an FDB, a rotary shaft 5 is rotatably inserted into a sleeve 3 with a bearing clearance formed between the rotary shaft 5 and the sleeve 3. A dynamic pressure generating groove 3A is formed on an inner peripheral surface of the sleeve 3. Lubricating oil is applied to the bearing clearance. A pressure is generated due to the pumping action of the dynamic pressure generating groove 3A caused by the rotation of the rotary shaft 5. As a result, the rotary shaft 5 rotates in the sleeve 3 without radial contact with the sleeve 3.

An example of a conventional apparatus for manufacturing this type of groove-equipped FDB is described below with reference to FIG. 5. As a conventional method for processing the dynamic pressure generating groove 3A, a method for plastically processing the dynamic pressure generating groove 3A by using hard balls is known. An apparatus for carrying out such a method is shown in FIG. 5. In this apparatus, a guide shaft 14 defines a guide hole 142 through a leading end of the guide shaft 14. Three balls 15 are held radially into the guide hole 142. The diameter of the balls is so selected that the sum of the diameter of the balls is slightly greater than an inner diameter of the sleeve 3.

In operation of the conventional apparatus, a rotational speed (W) and a feeding speed (V) with respect to the sleeve 3 are simultaneously applied to the guide shaft 14, the dynamic pressure generating groove 3A resembling the motion of the hard balls 15 is thus formed by plastic processing. If processing the dynamic pressure generating groove 3A of a herringbone type as shown in FIG. 4, when the balls 15 have been fed to the approximate center of the sleeve 3, a half of the pressure generating groove 3A slanting in one direction with respect to the axis of the sleeve 3 is formed. The rotational direction of the guide shaft 14 is then inverted without changing the feeding speed (V) of the guide shaft 14 to process the other half of the pressure generating groove 3A slanting in another direction with respect to the axis of the sleeve 3.

Since the pressure generating groove 3A is a result of the motion of the hard balls 15, a high manufacturing precision of the apparatus is required to achieve a high accuracy of the pressure generating groove 3A. For example, a high consistency of concentricity of a tooling portion of the apparatus must be satisfied, that is, a circumscribed circle about the hard balls 15 is required to be highly concentric with the guide shaft 14. In the apparatus as described above, however, the hard balls 15 are separately manufactured and then assembled to the guide shaft 14. These separate components impose difficulty to manufacture the apparatus with high precision, since it is required not only that the discrete components be precisely manufactured, but also that the discrete components be precisely assembled.

Therefore, a fluid dynamic bearing manufacturing tool which has a high precision and is relatively easier to be manufactured is desired.

SUMMARY OF THE INVENTION

The present invention is directed to a fluid dynamic bearing manufacturing tool which has a high precision and is relatively easier to be manufactured.

A manufacturing tool for forming a dynamic pressure groove in an inner peripheral surface of a bearing sleeve of a fluid dynamic bearing comprises a tool shaft for being rotated in a bore of the bearing sleeve while being moved in an axial direction thereof. A plurality of machining tips is integrally formed on the tool shaft for machining the inner peripheral surface of the bearing sleeve to form the dynamic pressure groove therein. A plurality of protrusions is formed on the tool shaft and the machining tips are formed on tops of the protrusions. When the machining of the groove is a cutting of the machining tips in the inner peripheral surface of the bearing sleeve, the protrusions function as a guide for guiding scraps generated by the cutting to leave the machining tips.

Other systems, methods, features and advantages of the present invention will be drawn from the following detailed description of the preferred embodiments of the present invention with attached drawings, in which:

DESCRIPTION OF PREFERRED EMBODIMENTS

Figure 1:
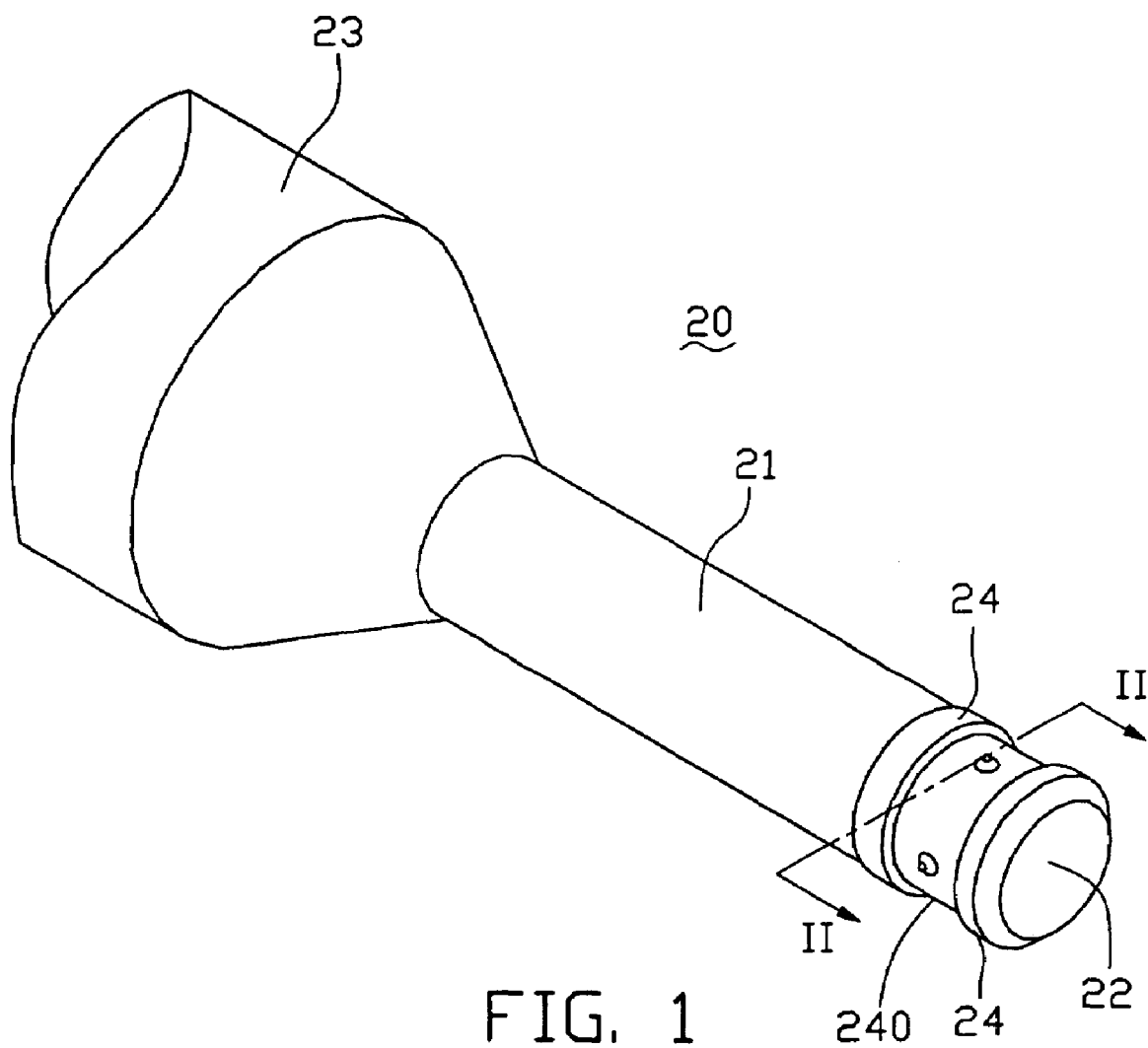
FIG. 1 is an isometric view of a manufacturing tool for a fluid dynamic bearing according to a preferred embodiment of the present invention.
Figure 3:
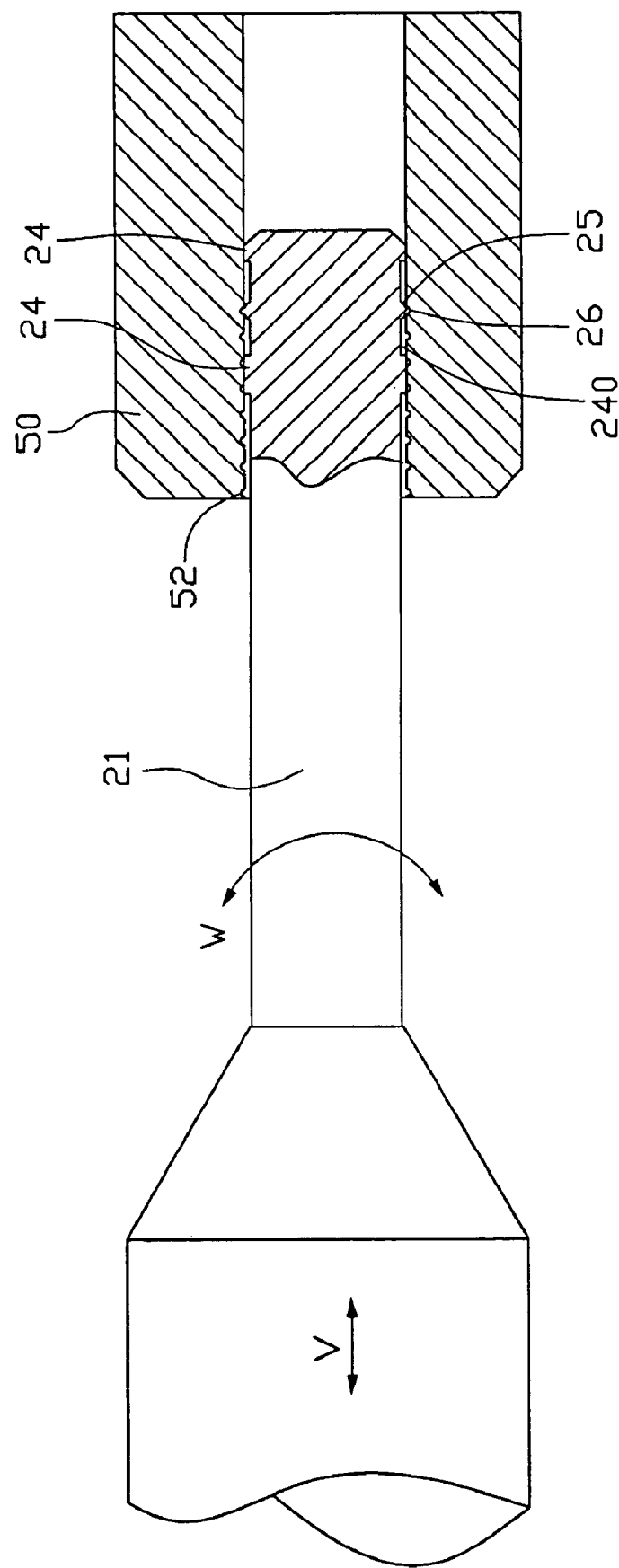
FIG. 3 is a side cross sectional view showing a combination of a work piece and the manufacturing tool of FIG. 1.
Figure 4:
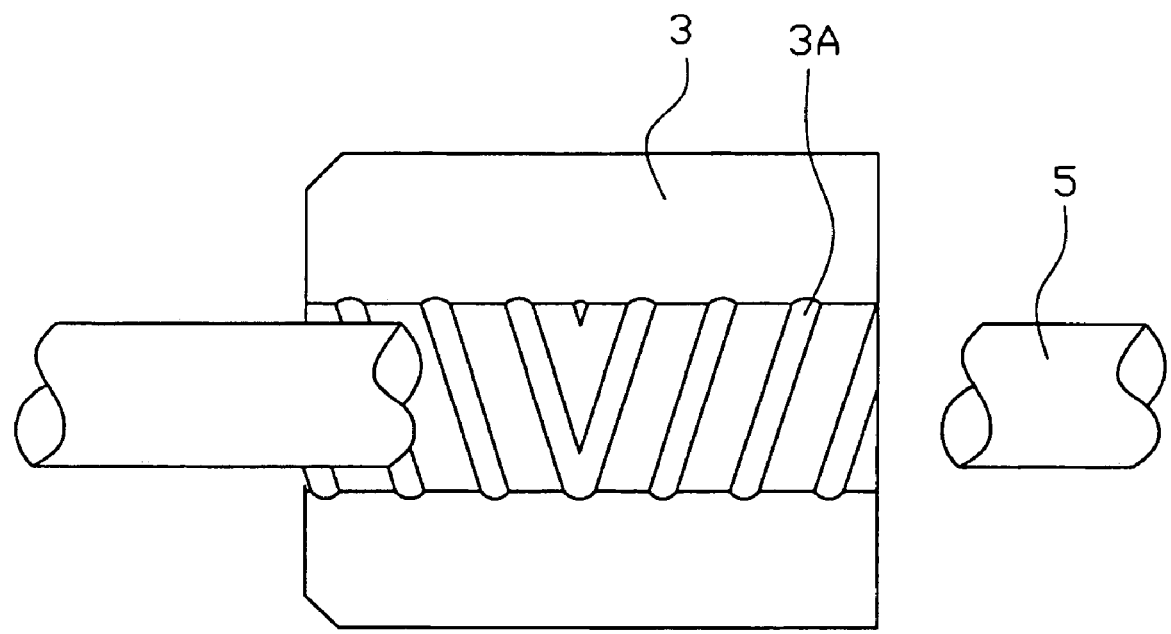
FIG. 4 is a side cross sectional view of a conventional fluid dynamic bearing assembly.
Figure 5:
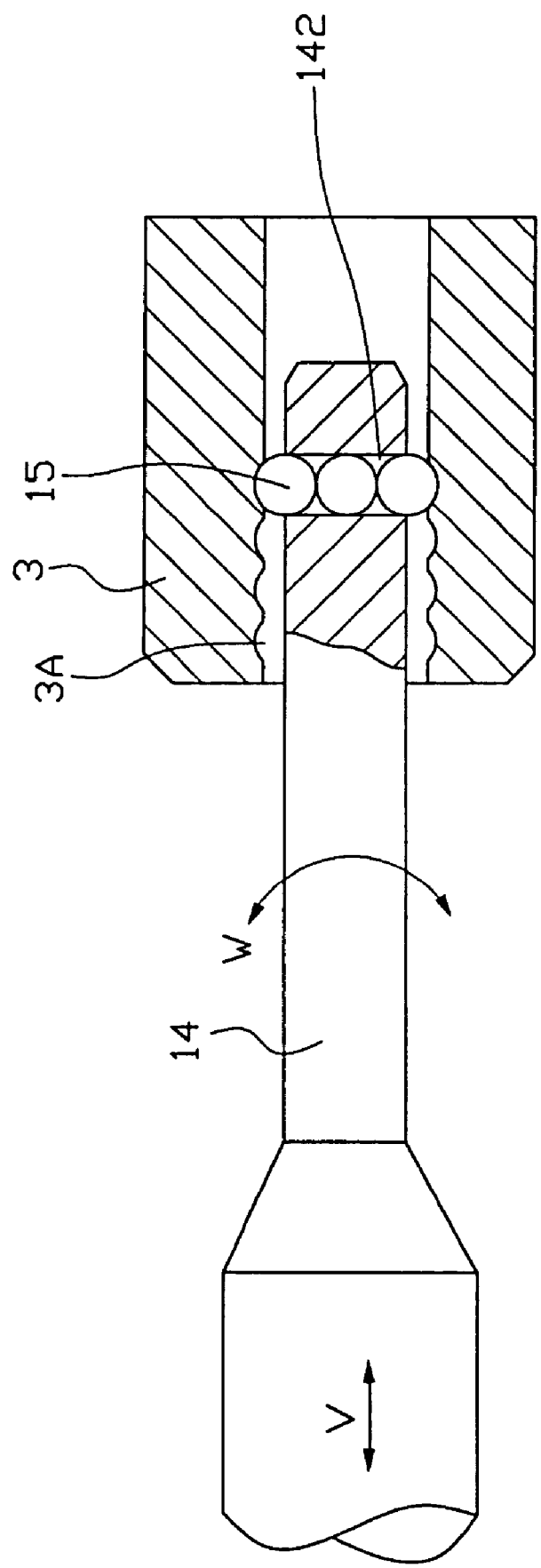
FIG. 5 is a side cross sectional view of a combination a work piece and a conventional manufacturing tool.

FIGS. 1 and 3 illustrate by way of example a manufacturing tool 20 in accordance with a preferred embodiment of the present invention, for forming a dynamic pressure generating groove 52 (Hereinafter referred to as "groove") of a bearing sleeve 50.

The manufacturing tool 20 comprises a tool shaft 21 having a leading end 22 and an opposite coupling end 23. The coupling end 23 is for being connected to axial and rotational drive means to simultaneously apply a rotational speed (W) and an axial feeding speed (V) to the tool shaft 21 with respect to the bearing sleeve 50.

A pair of axially spaced guiding flanges 24 is formed around the leading end 22 of the tool shaft 21. Each guiding flange 24 is cylindrical and has an outer circumference that is concentric with the tool shaft 21. An annular recess 240 is thus formed around the tool shaft 21 between the guiding flanges 24. The outer diameter of the guide flange 24 is equal to or slightly less than the inner diameter of the bearing sleeve 50, so that during operation the tool shaft 21 extends into the bearing hole of the bearing sleeve 50 with the guide of the guiding flanges 24 and without damaging the inner periphery of the bearing sleeve 50 by the guide flanges 24.

Figure 2:
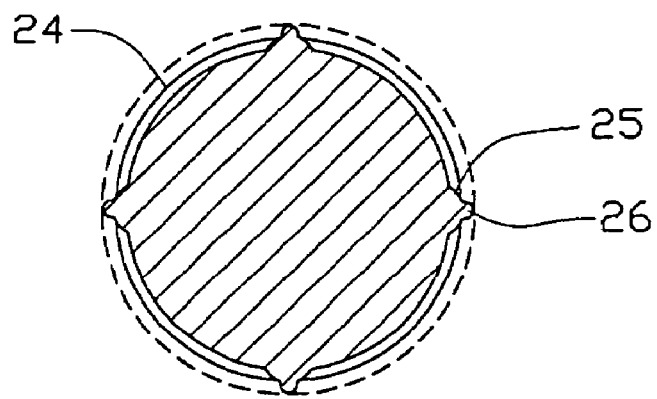
FIG. 2 is a cross sectional view of the manufacturing tool of FIG. 1, taken along line II-II thereof.

Referring also to FIG. 2, a plurality of protrusions 25 is provided on the tool shaft 21 between the guiding flanges 24. In the preferred embodiment, four protrusions 25 are formed on the tool shaft 21, which are equally spaced from each other. Alternatively, more or less than four protrusions 25 may be selected according to practical needs. Each protrusion 25 has a convex outer surface. Each protrusion 25 has a protruding altitude substantially equal to a protruding altitude of the guiding flanges 24, so that the outmost faces of the guiding flanges 24 and outmost ends of the protrusions 25 are generally located in a same circle as shown in FIG. 2.

A machining tip 26 is formed on the outmost end of each protrusion 25. The machining tip 26 serves for interferentially engaging with the inner peripheral surface of the bearing sleeve 50 to form the groove 52 therein. Therefore, the protruding altitude of each machining tip 26 is designed to be equal to the depth of the groove 52 to be formed. Each machining tip 26 comprises a root connected with the outmost end of a corresponding protrusion 25, and a top for machining the bearing sleeve 50. Tops of the machining tips 26 are commonly located in a hypothetical circle that is concentric with the tool shaft 21 and as shown in broken line in FIG. 2.

In processing the machining tips 26, electrical discharge machining (EDM) or ultrasonic machining (UM) is preferred, because these processes are capable of providing satisfactory accuracy of the machining tips 26. In the preferred embodiment, an EDM tooling head (not shown) is used, having a profile corresponding to one machining tip 26, one protrusion 25 in connection therewith and the tool shaft 21 about the annular recess 240. In operation, the tooling head approaches the tool shaft 21 which has not been formed with the annular recess 240, the protrusions 25 and the machining tips 26 yet at a location where the annular recess 240 is to be formed, to thereby form a first machining tip 26, a first protrusion 25 connecting with the first machining tip 26 and a first portion of the annular recess 240 which is slightly larger than one-fourth (¼) of the entire annular recess 240. Then the tool shaft 21 is rotated 90 degrees, and the EDM tooling head is used again to form a second machining tip 26 and a second protrusion 25 connecting with the second machining tip 26 and a second portion of the annular recess 240. The above step is repeated until a fourth machining tip 26, a fourth protrusion 25 and the entire annular recess 240 are formed. The manufacturing tool 20 inclusive of the coupling end 23 and the tool shaft 21 in the preferred embodiment is made of tungsten carbide. Alternatively, the manufacturing tool 20 can be made by other material having a high hardness, such as high speed steel (HSS). The requirement of the material for the manufacturing tool 20 is that it has a hardness that is larger than that of the bearing sleeve 50.

In operation of the manufacturing tool 20 for manufacturing a fluid dynamic bearing, the tool shaft 21 is first inserted into the bore of the bearing sleeve 50. The tool shaft 21 is then rotated in the rotational direction (W) by the rotational driving means and fed in the feeding direction (V) by the axial driving means. That is, in the bearing sleeve 50, a speed is applied to the tool shaft 21 in the feeding direction (V) and the rotational direction (W), with the result that the machining tips 26 of the tool shaft 21 are fed into the bore of the bearing sleeve 50 and interferentially engage with the inner peripheral surface of the bearing sleeve 50. In the preferred embodiment, the groove 52 is formed in the inner peripheral surface of the bearing sleeve 50 by the tips 26 cutting the inner peripheral surface of the bearing sleeve 50. During the processing, the outer surface of the protrusion 25 serves for a scrap guiding surface along which scraps produced by the cutting of the machining tips 26 on the bearing sleeve 50 can timely flow into the recess 240 to thereby prevent the scraps from being accumulated on the machining tips 26, which may hinder a correct formation of the groove 52. Alternatively, the tips 26 can be formed to have a configuration for plastically forming the groove 52 on the inner peripheral surface of the bearing sleeve 50. Whether cutting or plastic forming for the formation of the groove 52 depends on the dimension and configuration of the machining tips 26, which can be easily decided by persons skilled in the art according to the practical requirements.

In the present invention, the machining tips 26 serving as processing the groove 52 is integrally formed with the tool shaft 21. Therefore, only the tool shaft 21 is required to be precisely shaped to ensure the accuracy of the manufacturing tool. The manufacturing tool with the required accuracy is thus relatively easier to be manufactured.

It is understood that the invention may be embodied in other forms without departing from the spirit thereof. The above-described examples and embodiments are to be considered in all respects as illustrative and not restrictive, and the invention is not to be limited to the details given above.

We claim:

1. A manufacturing tool for forming a dynamic pressure groove in an inner peripheral surface of a bearing sleeve, the manufacturing tool comprising:
   a tool shaft for being rotated in a bore of the bearing sleeve while being moved in an axial direction thereof; and
   a plurality of machining tips integrally formed on the tool shaft for interferentially engaging with the inner peripheral surface of the bearing sleeve to form the dynamic pressure groove thereby;
   wherein a plurality of protrusions are integrally and circumferentially arranged on an outer periphery of the tool shaft near a leading end thereof, and the machining tips are respectively integrally formed on outmost ends of the protrusions.

2. The manufacturing tool as described in claim 1, wherein tops of the tips are commonly located at a hypothetical circle that is concentric with the tool shaft.

3. The manufacturing tool as described in claim 1, wherein each of the protrusions comprises a convex outer surface.

4. The manufacturing tool as described in claim 1, wherein at least one guiding flange is formed around the tool shaft adjacent the protrusions, and the outer diameter of the guiding flange is substantially equal to the diameter of the bore of the bearing sleeve.

5. The manufacturing tool as described in claim 4, wherein said at least one guiding flange comprises two axially spaced guiding flanges with the protrusions located therebetween.

6. The manufacturing tool as described in claim 4, wherein the outer circumferential face of said at least one guiding flange and the outmost ends of the protrusions are located at a same circle when viewed from the leading end along the axis of the tool shaft.

7. A manufacturing tool for forming a dynamic pressure groove on an inner peripheral surface of a bearing sleeve, the manufacturing tool comprising:

a tool shaft comprising a leading end;

a plurality of machining tips integrally formed around an outer periphery of the tool shaft near the leading end thereof, each of the machining tips comprising a top and a root, the tops being commonly located in a hypothetical circle that is concentric with the tool shaft; and a guiding surface joining the root of each of the machining tips to the outer periphery of the tool shaft; wherein when the tool shaft is rotated in a bore of the bearing sleeve while being moved in an axial direction thereof, the machining tips abut against the inner peripheral surface of the bearing sleeve to form the dynamic pressure groove therein.

8. The manufacturing tool as described in claim 7, wherein at least one guiding flange is formed around the tool shaft adjacent the machining tips, and the outer diameter of the guiding flange is substantially equal to the diameter of the bore of the bearing sleeve.

9. The manufacturing tool as described in claim 8, wherein said at least one guiding flange comprises two axially spaced guiding flanges, and the guiding flanges are arranged at opposite sides of the machining tips respectively.

10. The manufacturing tool as described in claim 9, wherein the roots of the machining tips and the outer circumferential faces of the guiding flanges are located at a same circle when viewed from the leading end along the axis of the tool shaft.

11. The manufacturing tool as described in claim 7, wherein the guiding surface is a convex surface.

12. A manufacturing tool for forming a dynamic pressure generating groove in a fluid dynamic bearing, comprising:

a coupling end adapted for receiving a rotational movement and a linear movement simultaneously;

a tool shaft extending from the coupling end and comprising:

a plurality of protrusions formed on an outer circumference of the tool shaft; and a plurality of machining tips on the protrusions, respectively, wherein the protrusions are integral to the tool shaft and the tips are integral to the protrusions, the machining tips being adapted for forming the groove;

wherein the tool shaft further comprises a recess, and the protrusions and machining tips are located in the recess;

wherein the tool shaft further comprises two flanges on the outer circumference thereof, and the recess is defined between the two flanges; and wherein a circle circumscribing the protrusions has a diameter that is substantially the same as that of one of the flanges.

13. The machining tool as described in claim 12, wherein the machining tips are so configured that they perform a cutting operation on the fluid dynamic bearing to form the groove.

14. The machining tool as described in claim 13, wherein the protrusions function for guiding scraps to leave the machining tips when the cutting operation is performed.

15. The machining tool as described in claim 12, wherein the machining tips are so configured that they perform a plastic forming operation on the fluid dynamic bearing to form the groove.

16. The machining tool as described in claim 12, wherein the machining tips have a number of four and are equally spaced from each other.

* * * * *